(12) United States Patent
Noerpel et al.

(10) Patent No.: US 6,249,677 B1
(45) Date of Patent: Jun. 19, 2001

(54) APPARATUS AND METHOD FOR DELIVERING KEY INFORMATION OF A CHANNEL REQUEST MESSAGE FROM A USER TERMINAL TO A NETWORK

(75) Inventors: Anthony Noerpel, Lovettsville, VA (US); Chandra Joshi, Gaithersburg; Stephanie Demers, Rockville, both of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/247,849

(22) Filed: Feb. 11, 1999

Related U.S. Application Data

(60) Provisional application No. 60/110,278, filed on Nov. 30, 1998.

(51) Int. Cl.$^7$ .................................................. H04Q 7/20
(52) U.S. Cl. ...................... 455/427; 455/12.1; 455/13.4; 370/316; 370/318
(58) Field of Search ..................... 455/427, 12.1, 455/13.2, 434, 515, 3.2; 370/316, 318, 321, 337, 341; 375/356, 357, 368

(56) References Cited

U.S. PATENT DOCUMENTS

| | | | |
|---|---|---|---|
| 4,054,753 | * 10/1977 | Kaul et al. ............................ | 370/324 |
| 4,597,079 | * 6/1986 | Aoki et al. ............................ | 370/220 |
| 5,301,194 | * 4/1994 | Seta ...................................... | 370/326 |
| 5,303,393 | * 4/1994 | Noreen et al. ........................ | 455/3.2 |
| 5,548,801 | 8/1996 | Araki et al. . | |
| 5,603,079 | * 2/1997 | Olds et al. ............................ | 455/13.1 |
| 5,914,942 | * 6/1999 | Hassan et al. ........................ | 370/316 |
| 6,058,307 | * 5/2000 | Garner .................................. | 455/428 |
| 6,097,952 | * 8/2000 | Kawabata ............................. | 455/435 |
| 6,105,060 | * 11/2000 | Rothblatt .............................. | 709/219 |
| 6,148,176 | * 11/2000 | Kolev et al. ......................... | 455/12.1 |
| 6,151,329 | * 11/2000 | Berrada et al. ...................... | 370/447 |

FOREIGN PATENT DOCUMENTS

| | | |
|---|---|---|
| 0 632 605 A2 | 1/1995 | (EP) . |
| 0 722 228 A2 | 7/1996 | (EP) . |
| 0 876 007 | 11/1998 | (EP) . |

* cited by examiner

*Primary Examiner*—William Trost
*Assistant Examiner*—Congvan Tran
(74) *Attorney, Agent, or Firm*—John T. Whelan; Michael W. Sales (57) ABSTRACT

An apparatus and method, for use with the satellite-based communications network, for improving the reliability and speed at which communication between a user terminal and the network is established. The apparatus and method arranges data of a channel request message transmitted from a user terminal to a satellite in the satellite-based network to insure that the most critical data for establishing communication between the user terminal and the satellite-based network is received at the satellite during the appropriate receiving time frame window. The channel request message includes a first data group necessary for establishing a communication link for which information is transmitted between the apparatus and the network, and a second data group including information for decreasing the amount time necessary to establish the communication link. The first data group is positioned at the center of the channel request message, with portions of the second data group at opposite ends of the channel request message. The time at which the user terminal transmits the channel request message is set based on a location of the apparatus within a spot beam, to take into account the appropriate propagation delay time for the message to travel from the apparatus to the satellite in the network, thus assuring that at least the first data group of the channel request message is received at the satellite during an appropriate receiving time frame window.

34 Claims, 5 Drawing Sheets

APPARATUS AND METHOD FOR DELIVERING KEY INFORMATION OF A CHANNEL REQUEST MESSAGE FROM A USER TERMINAL TO A NETWORK

CROSS-REFERENCE TO RELATED APPLICATIONS

This application claims the benefit under 35 U.S.C. §119 (e) of a U.S. provisional application of Anthony Noerpel, Chandra Joshi and Stephanie Demers entitled "Techniques to Deliver the Key Information of the Channel Request Message from the User Terminal to the Network", Ser. No. 60/110,278, filed on Nov. 30, 1998, the entire contents of which are incorporated by reference herein.

Related subject matter is disclosed in a copending U.S. patent application of Chandra Joshi, Anthony Noerpel, Neeraj Tewari, Gerald Stelzer, David Roos and Chi-Jiun Su entitled "System and Method for Implementing Terminal to Terminal Connections via a Geosynchronous Earth Orbit Satellite", Ser. No. 09/115,098, filed on Jul. 13, 1998, and in a copending U.S. patent application of Stephanie Demers, Michael Parr, Anthony Noerpel and David Roos entitled "Method and System for Position Determination Using a Geostationary Earth Orbit Satellite", Ser. No. 09/200,133, filed on Nov. 25, 1998, the entire contents of both applications being expressly incorporated herein by reference.

BACKGROUND OF THE INVENTION

1. Field of the Invention:

The present invention relates to an apparatus and method, for use with the satellite-based communications network, for improving the reliability and speed at which communication between a user terminal and the network is established. More particularly, the present invention relates to an apparatus and method for arranging data of a channel request message transmitted from a user terminal to a gateway station via a satellite in the satellite-based network to insure that critical data for establishing communication between the user terminal and the satellite-based network is received at the satellite during the appropriate receiving time frame window.

2. Description of the Related Art:

A satellite communications network, such as a geosynchronous earth orbit mobile communications network, comprises at least one geosynchronous earth orbit satellite, a ground-based advanced operations center (AOC) and spacecraft operations center (SOC) associated with the satellite, at least one ground-based gateway station (GS), and at least one user terminal (UT), which is typically a hand-held or vehicle mounted mobile telephone. The satellite enables the user terminal to communicate with other user terminals, or with other telephones in the terrestrial public switched telephone network (PSIN), via the gateway stations under the control of the gateway stations. The AOC provides system-wide resource management and control functions for its respective satellite, and the SOC controls on-orbit satellite operations for its respective satellite.

When a user terminal is operated to establish a radio resource connection, it generates and transmits a channel request message to the network on a random access channel (RACH) at a frequency assigned by the gateway station to a spot beam covering an area in which the user terminal is located. Typically, a channel request message includes data used to represent the mobile user terminal, as well as contention resolution and timing synchronization information.

To increase the likelihood that the channel request message is received at the satellite during a receiving time frame, the transmitter of the user terminal takes into account an estimated time which will elapse between the point in time when the channel request message is transmitted and the point in time when the channel request message is received at the satellite, which is known as the propagation delay. Typically, a user terminal will calculate, based on information broadcast by the network, the propagation delay for a distance measured from a location on the earth'ss surface at the center of the spot beam in which the user terminal is located to the satellite, which is orbiting at about 22,000 miles above the earth's surface. Because the distance from the surface of the earth at the equator to the satellite is less than the distance from the surface of the earth in the extreme northern and southern hemispheres to the satellite, the propagation delay for a message sent from a user terminal close to the equator is less than that for a message sent from a user terminal in, for example, northern Europe.

Also, if the user terminal is at a distance from the center of the spot beam, the propagation delay is different than at the center of the spot beam, because the distance from the user terminal to the satellite is different. However, some user terminals are equipped with global positioning system (GPS) equipment and could thus better estimate their location with respect to the center of their respective spot beam. Also, some user terminals can estimate their location with respect to the center of their respective spot beam based on the power level at which the user terminal receives the spot beam. In either instance, these type of user terminals can better estimate the propagation delay for the channel request message, and therefore increase the likelihood that the channel request message will be received at the satellite during a receiving time frame. Moreover, because the duration of a conventional channel request message is a fraction of the duration of a receiving time frame at the satellite, the entire channel request message can generally be received within the desired time frame.

To decrease call set up time, it is desirable to include in the channel request message information pertaining to the position of the user terminal making the call, the called party number, the cause for establishing the call, the service provider identification, and so on, in addition to the contention resolution and synchronization information. However, this additional information increases the overall length of the channel request message, and thus increases the likelihood that a complete channel request message will not be received by the satellite during a receiving time frame window. That is, if the instant at which the channel request message is transmitted is not accurately synchronized with the receiving time frame window, some of the information in the channel request message will not reach the satellite during the receiving time frame window, and will thus be lost. Consequently, if information necessary for call set up, such as contention resolution and timing synchronization information, is not received by the satellite, the call cannot be set up. Furthermore, even if the user terminal resends the channel request message, unless the timing difference between transmission of the channel request message and the appearance of the receiving time frames at the satellite is resolved, the network still cannot set up a call.

Accordingly, a need exists for an apparatus and method which enables a user terminal to transmit additional call set-up information in a channel request message to accelerate call set-up time between the user terminal and satellite-based communications network, while also assuring that the information necessary for call set-up is received intact by the satellite in the network.

SUMMARY OF THE INVENTION

An object of the present invention is to provide an apparatus and method for generating and arranging call set-up information in a channel request message transmitted by a user terminal to a gateway station in a satellite-based communications network via a satellite in the network to assure that the information necessary for establishing communication between the user terminal and the network is received intact during a receiving time frame established at the satellite.

Another object of the invention is to provide an apparatus and method for generating and arranging call set-up information in a channel request message transmitted by a user terminal to the gateway station via a satellite to assure that the information necessary for establishing communication between the user terminal and the gateway station, as well as information for accelerating call set-up, are received intact during a receiving time frame established at the satellite.

A further object of the invention is to provide an apparatus and method for setting the transmission time of a channel request message from a user terminal to a satellite based on the position of the user terminal within a spot beam propagating from the satellite to assure that the channel request message is received at the satellite during a receiving time frame.

These and other objects of the present invention are substantially achieved by providing an apparatus, such as a mobile telephone or other user terminal, for use in a satellite-based communications network, for generating and transmitting a channel request message. The apparatus comprises a channel request message generator which generates a channel request message including a first data group for establishing a communication link over which information is transmitted between the apparatus and the network, and a second data group including information for decreasing the amount time necessary to establish the communication link. The first data group includes contention resolution data and synchronization pattern data. The second data group includes position data representing a position of the apparatus, identifier data identifying the apparatus, service provider data representing a service provider for the apparatus, second identifier data identifying a second apparatus with which the apparatus is attempting to communicate through the network, and call establishment cause data representing a cause for which said apparatus is attempting to establish communication with the second apparatus, such as in response to a page, an alert, an emergency call, a terminal location update, and the like.

The apparatus further comprises a transmitter which transmits the channel request message to the network within a time period, such that an initial portion of the second data group is transmitted before any of the first data group, and a remaining portion of the second data group is transmitted after all of the first data group. The transmitter sets the starting time of the time period for transmission so that at least all of the first data group, and preferably also all of the second data group, of the transmitted channel request message are received at a satellite of the communications network during a channel request message receiving time frame at the satellite. In particular, the apparatus controls the transmitter to set the starting time of the time period for transmission of the channel request message based on a location of the apparatus within a spot beam and, in particular, based on the location of the apparatus with respect to the center of the spot beam, to take into account the appropriate propagation delay time for the message to travel from the apparatus to the satellite.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
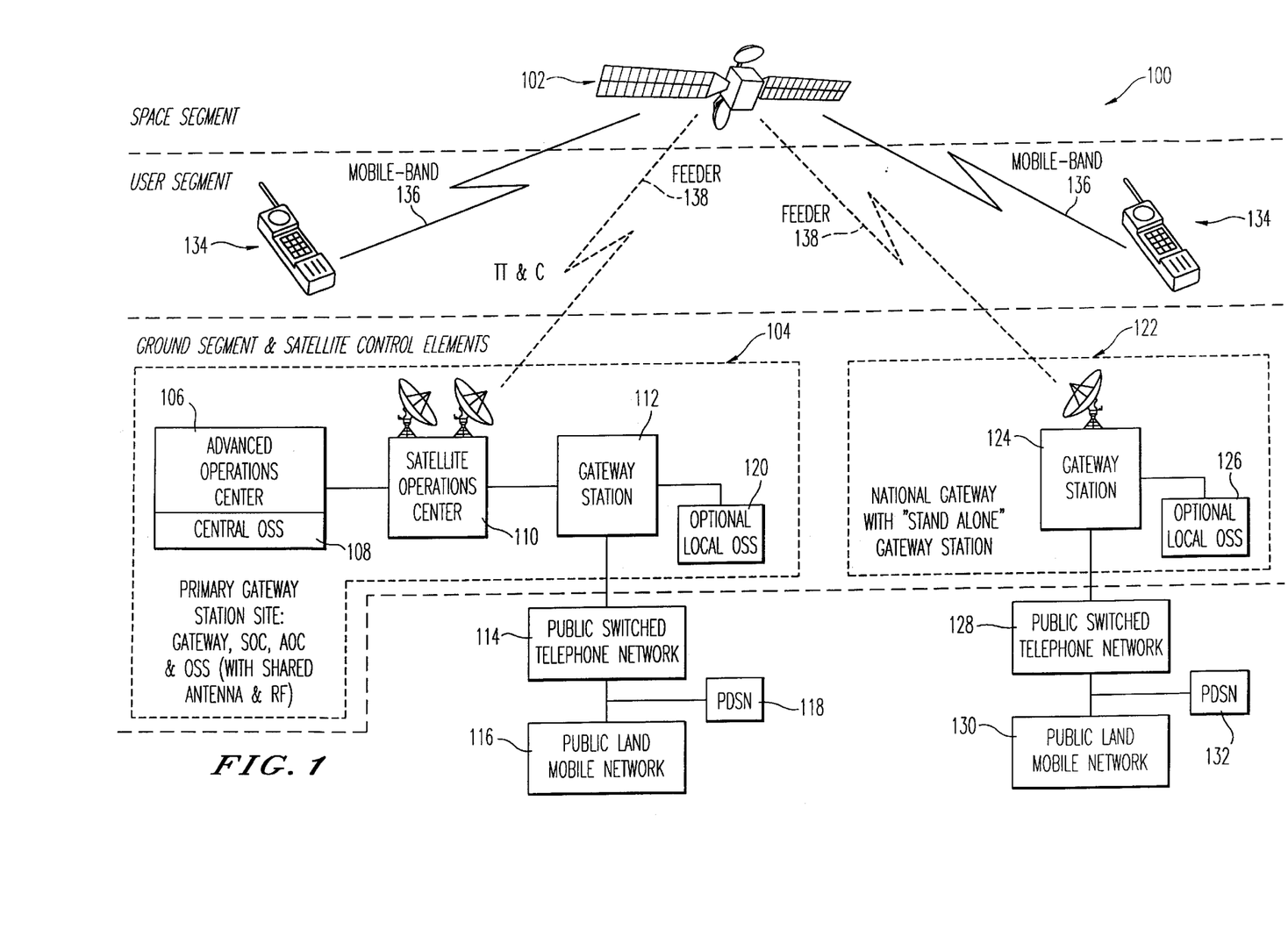
FIG. 1 is a schematic block diagram of a satellite communications network according to an embodiment of the present invention.

FIG. 1 illustrates an example of a satellite communications network 100 according to an embodiment of the present invention. The satellite communications network includes at least one satellite 102 which is, for example, a geosynchronous earth orbit satellite, and at least one primary gateway station 104. The primary gateway station 104 comprises an advanced operations center (AOC) 106, a central operations support system (OSS) 108, a satellite operation center (SOC) 110 and a gateway station 112 which provides access to a public switched telephone network (PSTN) 114. The PSTN 114 provides access to the public land mobile network (PLMN) and public switched data network (PSDN) 118. Optionally, the gateway station 112 can include a local operations support system (LOSS) 120.

The network 100 further includes a national gateway 122 comprising a gateway station 124 which optionally includes a local OSS 126. The national gateway 122 provides access to a PSTN 128, which provides access to a PLMN 130 and a PSDN 132. Further details of the primary gateway station 104 and national gateway station 122 and their respective components and operations are set forth in copending U.S. patent application Ser. No. 09/115,098, referenced above.

Figure 2:
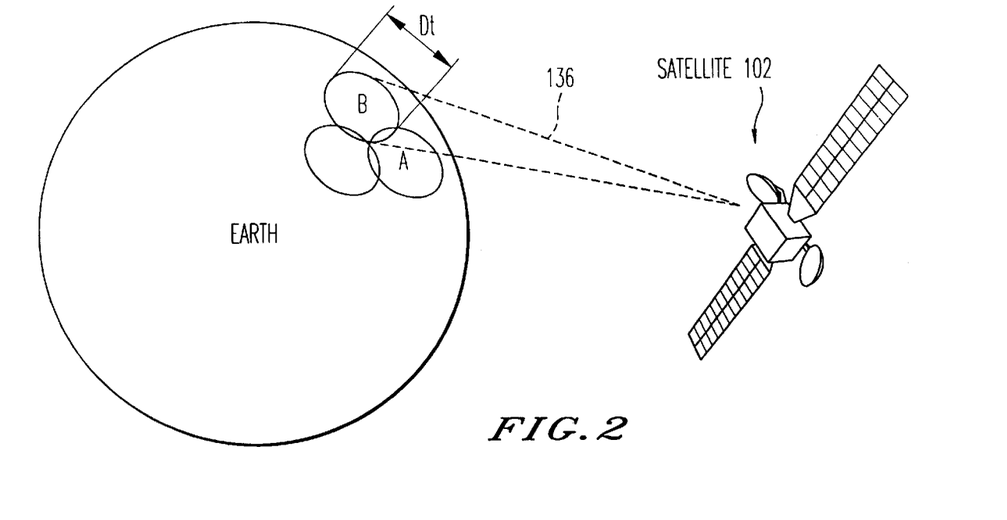
FIG. 2 is a schematic diagram illustrating a satellite in the satellite communications network shown in FIG. 1, projecting a plurality of spot beams onto different regions on the surface of the earth.

The satellite communications network 100 further includes at least one user terminal 134, such as a hand-held telephone or vehicle-mounted telephone, which can operate in the geosynchronous earth orbit satellite communications network 100 discussed above, as well as in a GSM or other cellular telephone networks. As shown in FIG. 2, the satellite 102 generates at least one spot beam 136 onto a predetermined geographic location of the surface of the earth. In this example, the satellite 102 generates a plurality of spot beams 136 onto different respective geographic locations on the earth's surface. A user terminal 134 communicates with the satellite over, for example, an L-band frequency designated by a particular spot beam 136 covering an area of the earth at which the user terminal 134 is located. The primary gateway station 102 and national gateway station 122 each communicate with the satellite 102 over, for example, a Ku-band frequency identified as a feeder signal 138 in FIG. 1. Communications can be originated by a user terminal 134. Alternatively, a call can originate from a telephone serviced by, for example, a PSTN, or from a telephone serviced by a GSM or other cellular networks. Details of the communication and control operations performed by the primary gateway station 104 and national gateway station 122 in relation to the satellite 102 and user terminal 134 to establish communication between two user terminals 134, or between a user terminal 134 and a terrestrial terminal such as a telephone serviced by a PSTN 114 or 128, are disclosed in U.S. patent application Ser. No. 09/115,098.

Figure 3:
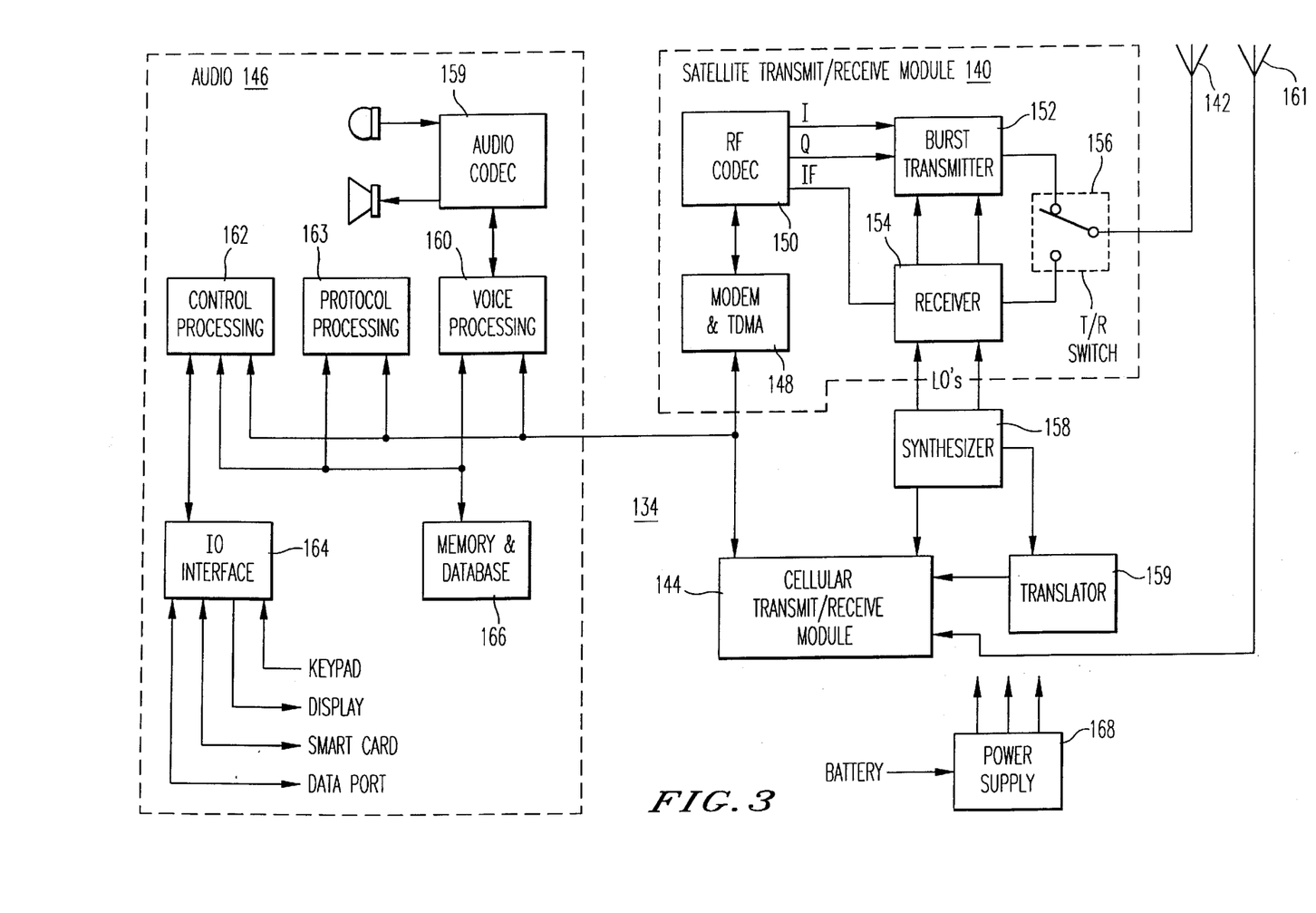
FIG. 3 is a block diagram of an example of a user terminal used in the satellite communications network shown in FIG. 1.

FIG. 3 is a block diagram illustrating a typical user terminal 134 included in the satellite communications network 100. As disclosed in U.S. patent application Ser. No. 09/115,098, user terminal 134 includes a satellite module 140, a satellite antenna 142, a cellular module 144, and a user interface module 146. The satellite module 140 is coupled to the user interface module 146, the cellular module 144, and the satellite antenna 142. The satellite antenna 142 can be a physically small antenna, such as a helix type antenna, or any other suitable antenna. The satellite module 140 includes a modem and TDMA unit 148, an RF coder and decoder (codec) 150, a burst transmitter 152, a receiver 154, and a transmit or receive (T/R) switch 156. The modem 148 is connected to the RF codec 150, and the RF codec 150 is connected to the burst transmitter 152 and to the receiver 154. The T/R switch 156 is connected to the burst transmitter 152, the receiver 154, and the satellite antenna 142, and allows the user terminal 134 to either transmit data or receive data.

The modem 148 converts speech or data samples to and from channel symbols using quadrature phase shift key modulation (QPSK). QPSK is preferably performed digitally by an application-specific integrated circuit or alternatively on a commercially available digital signal processor. The RF codec 150 converts channel symbols from the modem 148 into baseband I and Q signals that are transmitted to the burst transmitter 152. In the receive direction, the RF codes 150 processes an IF signal 153 from the receiver 154 for input to the modem 148.

The burst transmitter 152 converts the I and Q signals from the RF codec 150 up to a desired frequency, preferably an L-band frequency, for transmission by the first antenna 142. The receiver 154 converts a received L-band signal from the first antenna 142 into the IF signal 153 sent to the RF codec 150.

The user terminal 134 also includes a synthesizer 158 that provides a fixed local oscillator (LO) signal for the RF codec 150. The synthesizer 158 is connected to the receiver 154 and to the cellular module 144, and includes a variable local oscillator for channel tuning within the satellite module 140 and generates data clock signals for the modem 148. Both the fixed local oscillator and the variable local oscillator within the synthesizer 158 may be adjusted based on commands from either gateway 104 or 124, or from another user terminal.

The user interface module 146 includes an audio and codec unit 159, a voice processing unit 160, a controller 162, an input/output (I/O) interface 164, and a memory 166. Preferably, each element within the user interface module 146 communicates with the other user interface elements. The voice processing unit 160 includes a voice transcoder that performs source coding to compress the digital 164 Kb/s PCM signal. Specifically, an encoder running on a programmable digital signal processor, such as a low delay CELP encoder, compresses the 64 Kb/s PCM signal into approximately a 3.6 Kb/s encoded signal. Alternatively, the encoder may be a multibased excited (MBE) type 3.6 Kb/s encoder that is well known to those skilled in the art.

The controller 162 provides a multitasking firmware environment for monitoring and controlling the mobile terminal hardware. The controller 162 may occupy the same processor as the voice transcoder or may optionally be disposed on a separate processor. Preferably, the controller 162 includes an I/O interface 164 that provides a communication interface with a user. The I/O interface 164 includes a keypad for entering data such as a phone number, a display, a data port for digital communication such as a facsimile transmission, and a smart card interface, such as that specified for GSM.

The cellular module 144 allows the user terminal 134 to communicate with a cellular system over a second antenna 161. The second antenna 161 preferably is a linearly polarized whip meeting cellular system standards, and the cellular module 144 uses standard components, such as a GSM chip set, known to those skilled in the art. The user terminal 134 can operate in a first mode where the user terminal 134 functions as a conventional cellular phone, and in a second mode where the terminal 134 communicates with the satellite 102. Also, a battery 168 is provided for portable operation of the user terminal 134.

As described above, the user terminal 134 provides dual-mode operation, that is, either cellular or satellite operation. Also, the user terminal 134 is mobile and provides high quality digital voice. Furthermore, the user terminal 134 permits paging and messaging, transmission at a 2400 or 4800 bps data rate, or higher, via the data port, and provides a convenient cellular-like interface. The user terminal 134 may transmit on a single channel using a single time slot within a carrier signal allowing many other user terminals 12 to transmit over the same carrier. Thus, the user terminal 134 efficiently transmits over L-band spot beam 136 frequency resources.

When a user terminal 134 initiates communications or, in other words, places a call, the user terminal 134 generates and transmits a channel request message on a RACH within a frequency assigned to the spot beam 136 having a coverage area in which the user terminal 134 is located. Specifically, the controller 162 reads information from the memory and database 166, and controls the modem and TDMA unit 148, RF coder and decoder 150, and burst transmitter 152, to generate and transmit the channel request message on the RACH.

Figure 4:
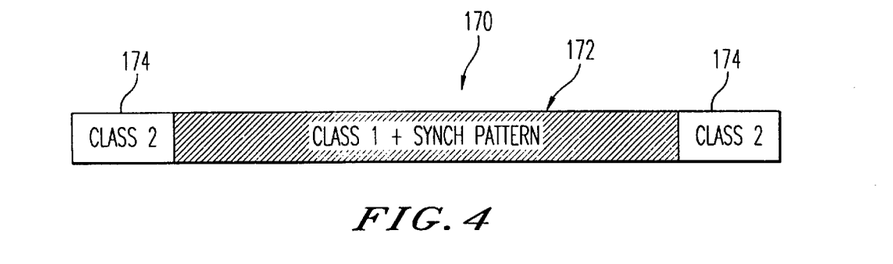
FIG. 4 illustrates an example of a channel request message format transmitted by the user terminal shown in FIG. 3.
Figure 5:
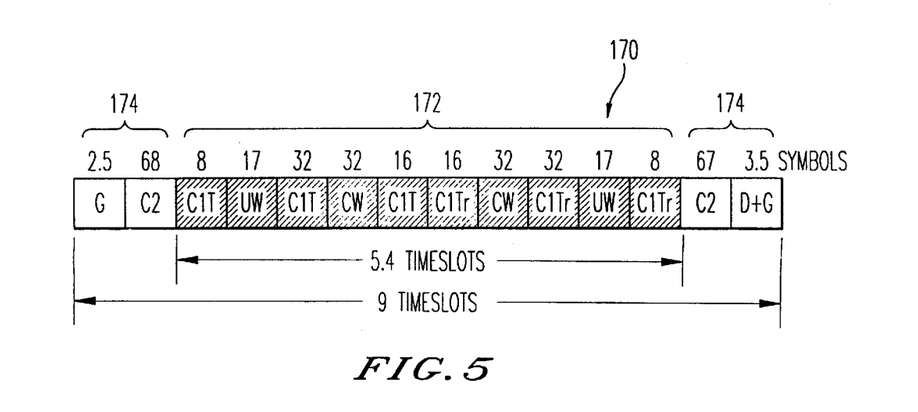
FIG. 5 is a more detailed illustration of the channel request message shown in FIG. 4, which illustrates symbols grouping in relation to the time slots making up the channel request message.

An example of a channel request message 170 that is generated and transmitted by the user terminal 134 is shown in FIGS. 4 and 5. That is, as indicated in FIG. 4, the channel request message 170 includes two general types of data, namely, Class 1 and synchronization data 172 and Class 2 data 174. More specifically, Class 1 and synchronization data 172 includes data for contention resolution and timing synchronization between the user terminal 134 and satellite 102 to enable the user terminal 134 to gain access to the satellite communications network 100 via satellite 102. Class 2 data 174, on the other hand, includes data to accelerate call set up time, which includes information such as the called party number, location of the user terminal 134 placing the call, identification of the service provider for the user terminal placing the call, the cause for establishing the call, such as a response to a page, an alert, an emergency call, a terminal location update, and so on.

As indicated in FIGS. 4 and 5, the Class 1 and synchronization data 172 includes data bits which are grouped within the center of the RACH burst or, in other words, between a two groups of Class 2 data bits which are positioned at each end of the channel request message 170 transmitted in the RACH burst. The Class 1 and synchronization data bits are heavily coded, such as by ⅛ coding, while the Class 2 data bits are less heavily coded, such as by ½ coding. In this example, the Class 1 and Class 2 bits prior to coding include 139 bits total, with 16 bits being Class 1 type data bits and 123 bits being Class 2 type data bits. Additional data bits such as guard data, tail data, unique word data, continuous wave data and dummy data, may also be included in the channel request message as demonstrated below. These additional bits, along with the existing 16 Class 1 type data bits and 123 Class 2 type data bits, are encoded by either rate ⅛ coding or rate ½ coding, as appropriate, which results in the channel request message 170 including 702 data bits making up 351 symbols (each symbol being made up of two data bits). The symbols are segregated into nine time slots of 39 symbols each, with the Class 1 and synchronization data 172 being positioned within the central 5.4 timeslots of the message 170.

As shown in FIG. 5, in particular, specific numbers of symbols make up certain data in the channel request message 170. That is, in viewing the channel request message 170 from left to right, 2.5 symbols (5 bits) make up guard data G, 68 symbols (136 bits) make up class 2 data C2, eight symbols (16 bits) make up Class 1 and tail data CIT, and 17 symbols (34 bits) make up unique word data UW. The unique word data is followed by 32 symbols (64 bits) making up additional CIT data, followed by 32 symbols (64 bits) making up continuous wave CW data, and another 16 symbols (32 bits) making up more CIT data. The following 16 symbols (32 bits) make up Class 1 and tail data repeated ClTr, followed by 32 symbols (64 bits) making up more CW data, another 32 symbols (64 bits) making up more ClTr data, 17 symbols (34 bits) making up UW data, and 8 symbols (16 bits) making up more ClTr data.

The next 67 symbols (134 bits) make up more C2 data, followed by a group of 3.5 symbols (7 bits) including one dummy D symbol and 2.5 G symbols. In this example, all UW data bits, CW data bits, C2 data bits and G data bits, and the single D data bit, have been rate ½ coded, while the CIT data bits and ClTr data bits have been rate ⅛ coded.

As indicated, the central 5.4 time slots comprising 210 symbols (420 bits) make up the Class 1 and synchronization data 172, while 70.5 symbols (141 bits) on each end of the Class 1 and synchronization data 172 make up the Class 2 data 174. The 5.4 time slots of Class 1 and synchronization data are positioned at the center of the channel request message 170 to assure that all the Class 1 and synchronization data 172 is always received during a receiving time frame "window" at the satellite 102 regardless of the location of the user terminal 134 within a spot beam 136.

Figure 6:
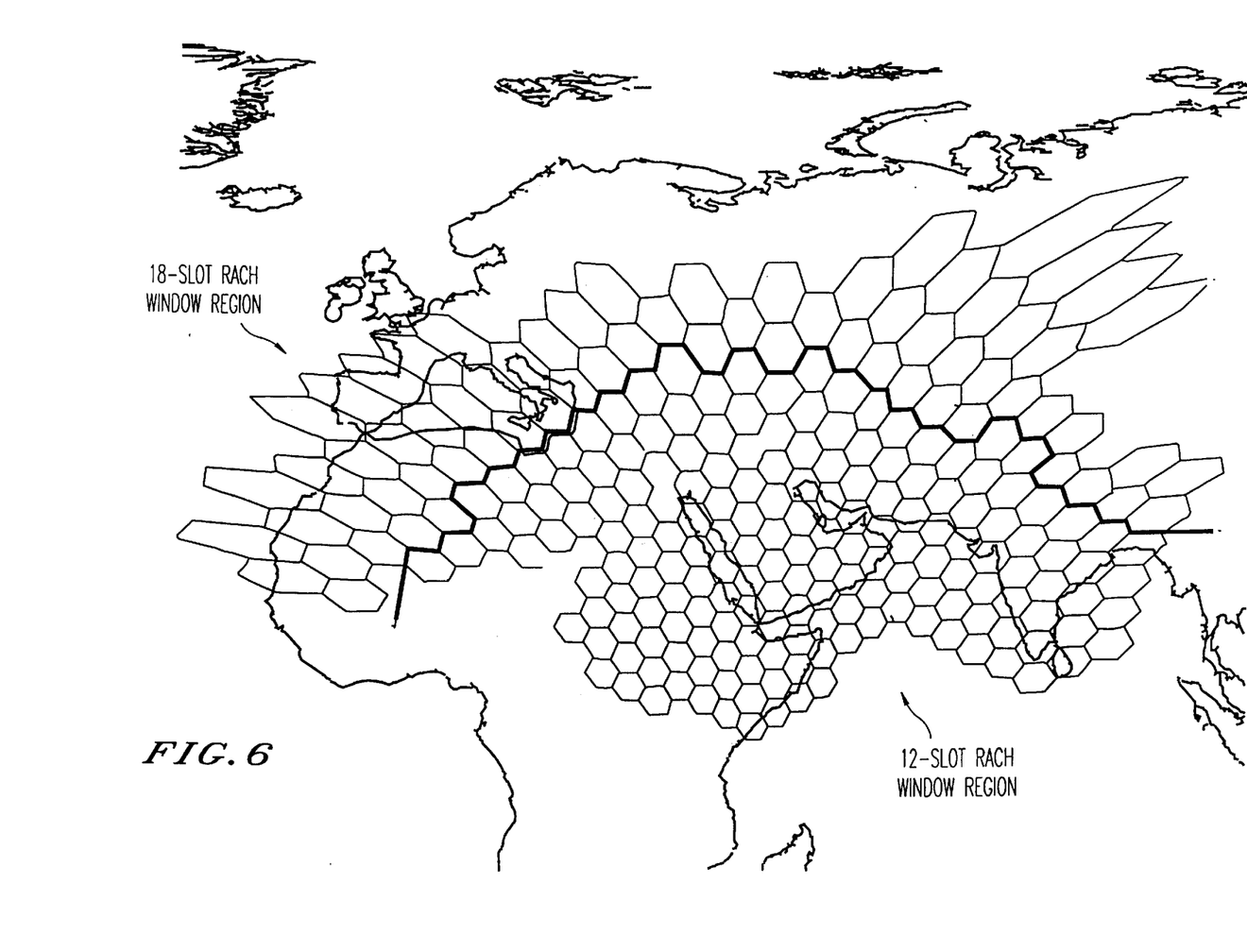
FIG. 6 is a diagram illustrating an example of the coverage areas provided by spot beams generated by a satellite of the network shown in FIG. 1 onto different geographic locations of the earth.

That is, as exemplified in the diagram of FIG. 6, for spot beams covering the geographic regions of the earth close to the sub-satellite point, the satellite 102 has a receiving time frame windows (RACH window size) of 12 time slots each. However, for elongated spot beams at the edge of coverage, the satellite 102 has a receiving time frame windows (RACH window size) of 18 time slots each. To assure that the channel request message is received during the appropriate time frame window at the satellite 102 for a particular spot beam in which the user terminal 134 is located, the user terminal 134 must take into account the amount of propagation delay before transmitting the channel request message 170. This propagation delay, from the satellite to the center of the spot beam in which the user terminal 134 believes it is located, is calculated by the user terminal 134 based on information broadcast by the network 100.

Figure 7:
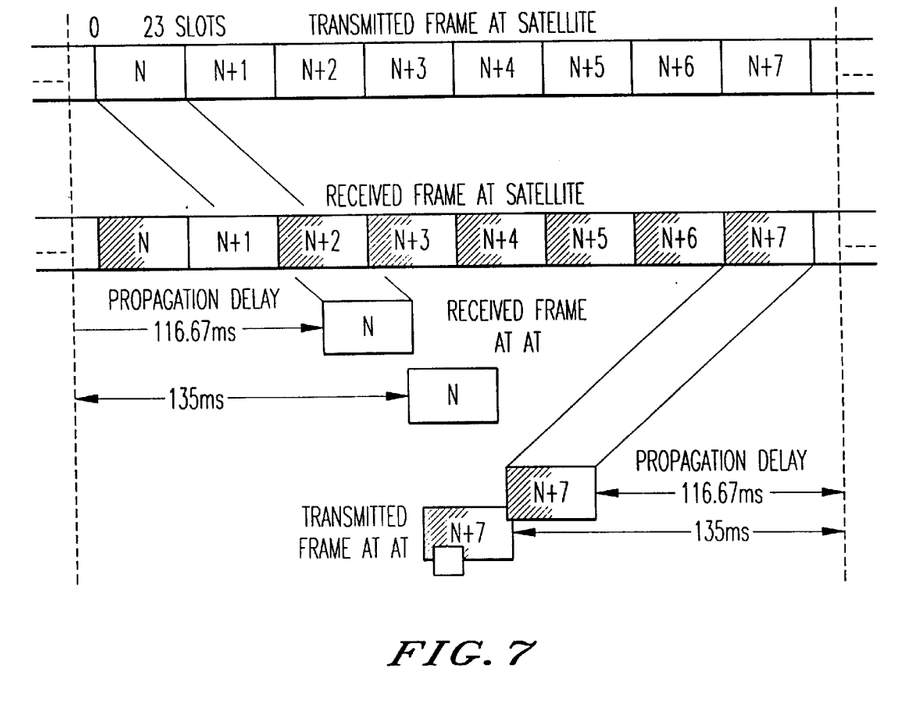
FIG. 7 is a timing diagram illustrating an example of the difference in propagation delay for frames of information being transmitted to a satellite in the network shown in FIG. 1 by user terminals located at different geographic regions on the surface of the earth.

As discussed above in the background section, and as shown in the timing diagram of FIG. 7, a channel request message 170, which travels at the speed of light when transmitted from the user terminal 134, will take a certain amount of time, known as the propagation delay, to reach the satellite 102 which is orbiting the earth at approximately 22,000 miles above the equator. For example, the propagation delay for a channel request message 170 transmitted from a user terminal 134 located on the equator to satellite 102 is about 116.67 milliseconds. However, the propagation delay between a user terminal 134 located in a northern region of the earth, such as Northern Europe, is about 135 milliseconds.

Furthermore, these propagation delay estimates are based on the distance between the satellite 102 and a center of a particular spot beam in which the user terminal 134 is most probably located. Hence, depending on the distance of the user terminal 134 from the center of its respective spot beam, a variation in propagation delay of up to about ±6 milliseconds can exist. This differential delay is unknown to the user terminal 134 without feedback from the satellite 102, and could result in a portion of the transmitted channel request message 170 failing to reach the satellite 102 during a receiving frame time period window, thus resulting in some of the channel request message 170 being unreceived by the network 100.

The user terminal 134 includes, for example, global positioning system (GPS) equipment which enables the user terminal 134 to determine its location on the surface of the Earth to within a tolerance limited by the accuracy of the GPS equipment. Also, the user terminal 134 can further estimate its location within a particular spot beam based on the relative power of the spot beam 136 that the user terminal 134 receives, as described in U.S. patent application Ser. No. 09/200,133, referenced above. Once the user terminal 134 determines its location within the spot beam 136 which it will employ to establish communication with the network 100, the user terminal 134 corrects the propagation delay value, which was calculated for the channel request message about to be transmitted, between the center of the spot beam and the satellite 102 based on information broadcast by the network 100.

In particular, the user terminal 134 calculates the propagation delay differential, in symbols, based on the location of the user terminal 134 in relation to the center of the spot beam. The user terminal 134 then compares the result of this calculation to the closest value out of a plurality of possible values, namely, seven possible values representing 0, ±47, ±94, and ±141 symbols, which are stored in memory 166. Based on the result of this comparison, the user terminal delays its burst transmission by the appropriate number of symbols to assure that the 9-timeslot channel request message 170 is received by the satellite 102 during the appropriate receiving time frame window which, as described above, is either 12 or 18 timeslots long, depending on the particular spot beam. Additionally, this correction factor is stored in the channel request message 170, so that the gateway station 104 can take this correction information into account when transmitting signals to the user terminal 134.

Accordingly, by correcting the transmission time for the channel request message 170, the user terminal 134 insures that at least the Class 1 and synchronization bits 172 are received at the satellite 102 during the appropriate receiving time frame window. Hence, even if some of the Class 2 bits 174 at the ends of the channel request message 170 are not received during the receiving time frame window and are lost, the network 100 can still establish initial communication with the user terminal 134. The network 100 can then send back a message to the user terminal 134 to request the user terminal 134 to retransmit the channel request message after having corrected for the timing discrepancy. Therefore, although call set-up time may be longer due to the loss of certain Class 2 data, set up of the call will still occur.

Finally, if the user terminal 134 is unsuccessful in establishing communication with the network 100 on a particular spot beam being received by the user terminal 134 at the highest power level, the user terminal 134 can attempt to establish communication with the network 100 by transmitting the channel request message 170 during a RACH burst within a frequency of a spot beam being received at the second strongest power level. If unsuccessful, the user terminal 134 can transmit the channel request message 170 at a frequency of the spot beam being received at the third highest power level, and so on, until communication is established. However, when changing spot beams, the user terminal 134 will have to recalculate the appropriate propagation delay and propagation delay correction for the spot beam being used.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An apparatus, for use in a satellite-based communications network, for generating and transmitting a channel request message, comprising:
   a channel request message generator which generates a channel request message including a first data group for establishing a communication link through which information is transmitted between said apparatus and said network, and a second data group; and
   a transmitter which transmits said channel request message to said network within a time period, such that an initial portion of said second data group is transmitted before any of said first data group, and a remaining portion of said second data group is transmitted after all of said first data group.

2. An apparatus as claimed in claim 1, wherein:
   said transmitter sets the starting time of said time period such that at least all of said first data group of said transmitted channel request message is received at a satellite of said communications network during a channel request message receiving period established at said satellite.

3. An apparatus as claimed in claim 2, wherein:
   said transmitter sets said starting time of said time period such that all of said first and second data groups of said transmitted channel request message are received at said satellite during said channel request message receiving period.

4. An apparatus as claimed in claim 1, wherein:
   said transmitter transmits all data in said first data group sequentially during a portion of said time period during which none of said second data group is transmitted.

5. An apparatus as claimed in claim 1, wherein:
   said transmitter sets the starting time of said time period for transmission of said channel request message based on a location of said apparatus within a spot beam generated by a satellite in said network.

6. An apparatus as claimed in claim 5, wherein:
   said transmitter sets said starting time of said time period based on a distance of said apparatus from the center of said spot beam.

7. An apparatus as claimed in claim 5, wherein:
   said transmitter selects one of a plurality of correction data based on said location of said apparatus within said spot beam, and sets said starting time based on said selected correction data.

8. An apparatus as claimed in claim 7, wherein:
   said channel request message generator includes said selected correction data in said channel request message.

9. An apparatus as claimed in claim 1, wherein:
   said first data group includes at least one of contention resolution data and synchronization pattern data.

10. An apparatus as claimed in claim 1, wherein:
    said second data group includes data for accelerating establishment of said communication link by said first data group.

11. An apparatus as claimed in claim 10, wherein:
    said second data group includes at least one of position data representing a position of said apparatus, identifier data identifying said apparatus, service provider data representing a service provider of said apparatus, second identifier data identifying a second apparatus with which said apparatus is attempting to communicate through said network, and call purpose data representing a cause for which said apparatus is attempting to establish communication with said second apparatus.

12. An apparatus as claimed in claim 1, wherein:
    said transmitter transmits said channel request message within said time period at a transmission frequency defined by a spot beam generated by a satellite in said network.

13. A satellite-based communications network, comprising:
    a satellite comprising:
       a satellite transmitter which generates at least one spot beam; and
       a satellite receiver which establishes a period of time, specific for each said spot beam, during which said receiver permits signal reception, and
    a terminal unit, separate from said satellite, comprising:
       a signal generator which generates a channel request message including first data, for establishing a communication link between said terminal unit and said satellite, and second data; and
       a signal transmitter which transmits said channel request message to said satellite at a transmission frequency designated by a selected said spot beam, such that at least all of said first data is received at said satellite receiver during said period of time established for said selected spot beam, wherein said terminal unit further comprises a terminal unit receiver which receives said at least one said spot beam and selects as said selected spot beam the spot beam being received at the greatest power level of any received spot beam; and said transmitter transmits said channel request message to said satellite at a frequency defined by said spot beam received at said greatest power level.

14. A satellite-based communications network as claimed in claim 13, wherein:

said signal transmitter transmits said channel request message to said satellite such that all of said first and second data are received at said satellite receiver during said period of time established for said selected spot beam.

15. A satellite-based communications network as claimed in claim 13, wherein:

if said terminal unit fails to establish said communication link with said satellite after said transmitter transmits said channel request message to said satellite at said frequency, said transmitter transmits said channel request message to said satellite at another frequency defined by a spot beam being received by said terminal unit receiver at a different power level.

16. A method for generating and transmitting a channel request message from a user terminal to a satellite in a satellite-based communications network, comprising the steps of:

generating a channel request message including a first data group for establishing a communication link through which information is transmitted between said user terminal and said network, and a second data group; and transmitting said channel request message to said network within a time period, such that an initial portion of said second data group is transmitted before any of said first data group, and a remaining portion of said second data group is transmitted after all of said first data group.

17. A method as claimed in claim 16, wherein:

said transmitting step transmits said channel request message such that at least all of said first data group of said transmitted channel request message is received at a satellite of said communications network during a channel request message receiving period established at said satellite.

18. A method as claimed in claim 16, wherein:

said transmitting step transmits said channel request message such that all of said first and second data groups of said transmitted channel request message are received at said satellite during said channel request message receiving period.

19. A method as claimed in claim 16, wherein:

said transmitting step transmits all data in said first data group sequentially during a portion of said time period during which none of said second data group is transmitted.

20. A method as claimed in claim 16, wherein:

said transmitting step sets the starting time of said time period for transmission of said channel request message based on a location of said apparatus within a spot beam generated by a satellite in said network.

21. A method as claimed in claim 20, wherein:

said transmitting step sets said starting time of said time period based on a distance of said apparatus from the center of said spot beam.

22. A method as claimed in claim 20, wherein said transmitting step comprises the steps of:

selecting one of a plurality of correction data based on said location of said apparatus within said spot beam; and setting said starting time based on said selected correction data.

23. A method as claimed in claim 22, wherein:

said generating step includes said selected correction data in said channel request message.

24. A method as claimed in claim 16, wherein:

said transmitting step transmits said channel request message within said time period at a transmission frequency defined by a spot beam generated by a satellite in said network.

25. A method for establishing communication between a user terminal and a satellite, comprising the steps of:

generating at least one spot beam from the satellite, establishing a period of time, specific for each said spot beam, during which said network permits signal reception at said satellite;

generating a channel request message including first data, for establishing a communication link between said terminal unit and said satellite, and second data;

transmitting said channel request message to said satellite at a transmission frequency designated by a selected said spot beam, such that at least all of said first data is received at said satellite during said period of time established for said selected spot beam, receiving said at least one said spot beam at said user terminal;

selecting as said selected spot beam the spot beam being received at the highest power level of any received spot beam; and wherein said transmitting step transmits said channel request message to said satellite at a frequency defined by said spot beam received at said highest power level.

26. A method as claimed in claim 25, wherein:

said transmitting step transmits channel request message to said satellite such that all of said first and second data are received at said satellite during said period of time established for said selected spot beam.

27. A method as claimed in claim 25, wherein:

if said terminal unit fails to establish said communication link with said satellite after transmitting said channel request message to said satellite at said frequency, transmitting said channel request message to said satellite at another frequency defined by a spot beam being received by said terminal unit at a different power level.

28. A data signal, embodied in a carrier wave, for establishing communication between a terminal and a satellite in a satellite-based communications network, said data signal comprising:

a first data segment comprising data for establishing a communication link through which information is transmitted between said terminal and said satellite; and a plurality of second data segments, each comprising data for accelerating establishment of said communication link by said first data segment, said first data segment being disposed between said plurality of second data segments.

29. A data signal as claimed in claim 28, wherein:

said first data segment includes at least one of contention resolution data and synchronization pattern data.

30. A data signal as claimed in claim 28, wherein:

said second data segment includes at least one of position data representing a position of said terminal, identifier data identifying said terminal, service provider data representing a service provider of said terminal, second identifier data identifying a second terminal with which said terminal is attempting to communicate through said network, and call purpose data representing a cause for which said terminal is attempting to establish communication with said second terminal.

31. A satellite-based communications network, comprising:

a satellite comprising:
   a satellite transmitter which generates at least one spot beam; and
   a satellite receiver which establishes a period of time, specific for each said spot beam, during which said receiver permits signal reception; and a terminal unit, separate from said satellite, comprising:
   a signal generator which generates a channel request message including first data, for establishing a communication link between said terminal unit and said satellite, and second data;
   a signal transmitter which transmits said channel request message to said satellite at a transmission frequency designated by a selected said spot beam, such that at least all of said first data is received at said satellite receiver during said period of time established for said selected spot beam; and
   a terminal unit receiver which receives said at least one said spot beam and selects as said selected spot beam the spot beam being received at the greatest power level of any received spot beam;

wherein said transmitter transmits said channel request message to said satellite at a frequency defined by said spot beam received at said greatest power level.

32. A satellite-based communications network as claimed in claim 31, wherein:

if said terminal unit fails to establish said communication link with said satellite after said transmitter transmits said channel request message to said satellite at said frequency, said transmitter transmits said channel request message to said satellite at another frequency defined by a spot beam being received by said terminal unit receiver at a different power level.

33. A method for establishing communication between a user terminal and a satellite of a satellite-based communications network comprising the steps of:

generating at least one spot beam from the satellite;

establishing a period of time, specific for each said spot beam, during which said network permits signal reception at said satellite;

generating a channel request message including first data, for establishing a communication link between said terminal unit and said satellite, and second data;

transmitting said channel request message to said satellite at a transmission frequency designated by a selected said spot beam received at the highest power level, such that at least all of said first data is received at said satellite during said period of time established for said selected spot beam;

receiving at least one said spot beam at said user terminal;

selecting as selected spot beam the spot beam being received at said highest power level of any received spot beam.

34. A method as claimed in claim 33, wherein:

if said terminal unit fails to establish said communication link with said satellite after transmitting said channel request message to said satellite at said frequency, transmitting said channel request message to said satellite at another frequency defined by a spot beam being received by said terminal unit at a different power level.

* * * * *